United States Patent

[11] 3,559,938

| [72] | Inventor | Allan E. Harris<br>Winnetka, Ill. |
|---|---|---|
| [21] | Appl. No. | 797,934 |
| [22] | Filed | Feb. 10, 1969 |
| [45] | Patented | Feb. 2, 1971 |
| [73] | Assignee | Harris-Hub Company, Inc.<br>Harvey, Ill.<br>a corporation of Illinois |

[54] LEG FOR SUPPORTING A FURNITURE FRAMEWORK
5 Claims, 5 Drawing Figs.

| [52] | U.S. Cl. | 248/188 |
| [51] | Int. Cl. | F16m 11/16 |
| [50] | Field of Search | 248/188, 188.1, 151, 168; 287/20; 16/29, 31 |

[56] References Cited
UNITED STATES PATENTS

| 640,265 | 1/1900 | Bolens | 248/188 |
| 1,389,008 | 8/1921 | Pohle | 248/188 |
| 1,881,491 | 10/1932 | Goetz | 248/188 |
| 2,607,051 | 8/1952 | Jackson | 16/29 |
| 2,700,584 | 1/1955 | Hobbs | 248/188 |

FOREIGN PATENTS

| 1,433,286 | 2/1966 | France | 248/188 |

*Primary Examiner*—Marion Parsons, Jr.
*Attorney*—Dressler, Goldsmith, Clement & Gordon ABSTRACT: A formed metal support leg for attachment to a bed or furniture frame, with the leg having a flat side surface adjacent the upper end thereof and a pair of oppositely disposed, outwardly extending tabs at the uppermost end of the leg. When the leg is secured to the furniture frame structure, the flat side surface seats against a side surface of the supporting frame and the outwardly extending tabs abut an underside of the furniture support frame.

PATENTED FEB 2 1971　　3,559,938
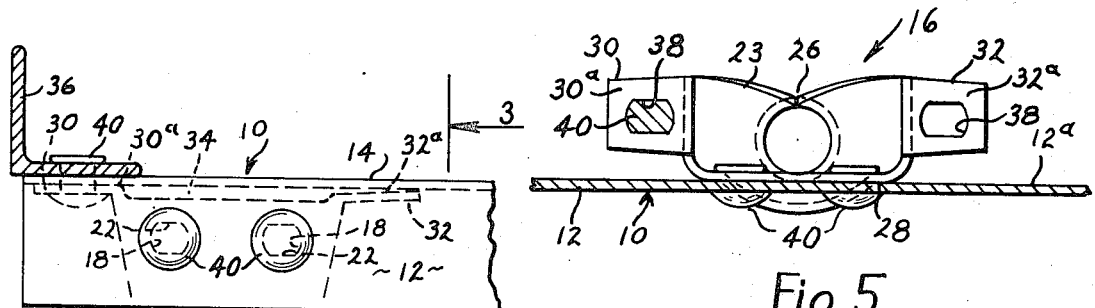
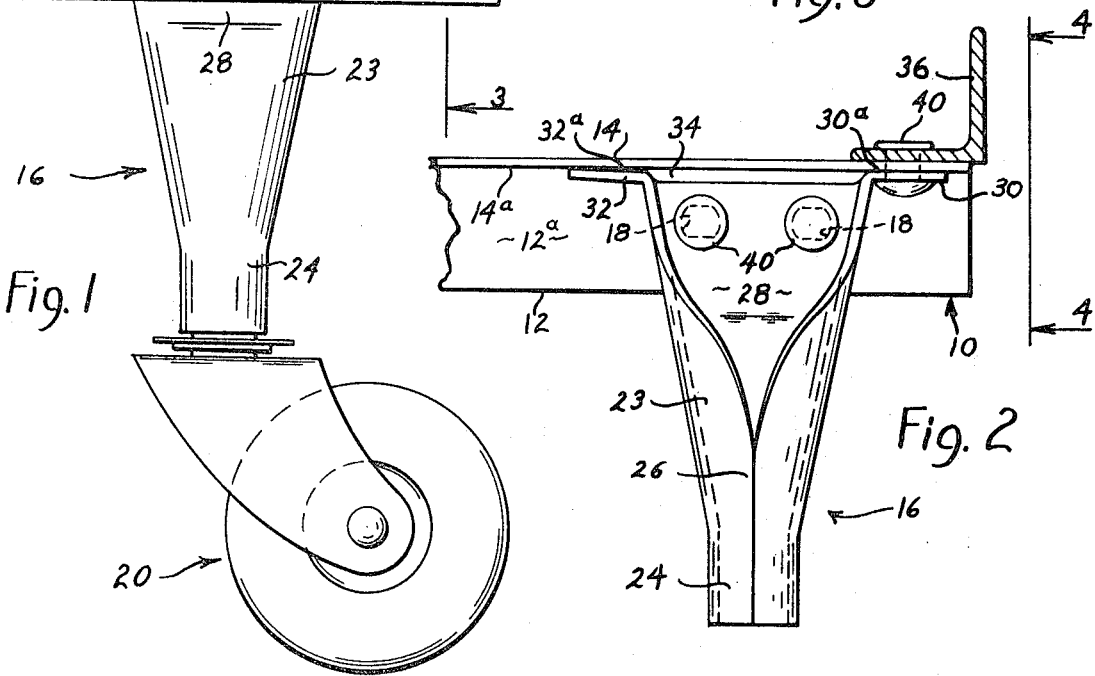
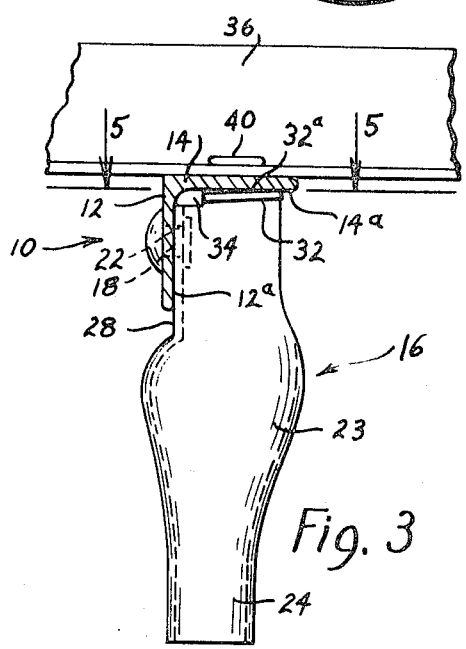
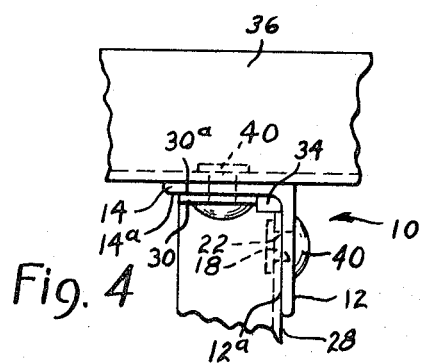

LEG FOR SUPPORTING A FURNITURE FRAMEWORK

BACKGROUND OF THE INVENTION

This invention relates to legs for various types of furniture, such as studio couches, sofas, day beds, hollywood beds, and the like, which generally utilize a metal-supporting framework. The invention particularly concerns the construction of a somewhat conically shaped, downwardly tapering leg and the means for securing it to such a supporting framework.

Several designs for formed metal furniture legs have been provided in the past and have proven useful and generally satisfactory for their specific requirements. An example of a particularly advantageous device is found in U.S. Pat. 2,825,073 and while the leg illustrated therein has met with wide commercial acceptance, it has been desired for some time to provide an even stronger leg. Also, there has been a need for a universally attachable leg structure which can be rigidly secured to various sizes of furniture supporting framework in a manner to withstand the stresses and strains imposed upon it by heavy vertical or compressive loads, as well as sideward loads and deflective forces caused by the movement of furniture from one place to another and the collision of the legs with some fixed object.

Past structures have required a multiplicity of fastener devices to rigidly secure them to furniture frames in order to resist the various stresses and strains imposed upon them. Furthermore, due to varying sizes of furniture supporting frameworks, there has been a concern of the specific size relationship between the interconnected surfaces between the framework and the leg attachment areas.

SUMMARY

The present structure provides a hollow formed sheet metal leg of a downwardly tapered contemporary appearance which is readily adaptable to a wide range of furniture requirements. The top formation of the leg provides an upper portion which can be rigidly connected to the furniture supporting frame with a minimum number of conventional fasteners, such as rivets, screws, or bolts and nuts. It is constructed so that it can be utilized with varying frame sizes without particular concern over manufacturing tolerances or interferences between the mating attachment surfaces. The formation of the uppermost or top end of the leg provides a pair of outwardly extending tabs which serve as a large load distribution area for absorbing the compressive or vertical loads as well as a means to resist sideward deflection caused by stresses and strains imposed on the leg structure. These tabs also provide a basis for fastener means to tie the top end of the leg to the frame structure. The bottom end or lower portion of the leg is formed to receive a conventional caster wheel, as well as other types of furniture leg devices, known commercially as furniture feet, or glides.

These features, as well as other advantages, will become apparent from the following description taken in conjunction with the accompanying drawings, in which:

BRIEF DESCRIPTION OF THE DRAWING

FIG. 1 is a front elevational view of the improved leg assembled with and secured to a furniture support framework;

FIG. 2 is a rear elevational view of the leg and support frame assembly shown in FIG. 1, with the caster wheel removed;

FIG. 3 is a view of one side of the leg and furniture framework assembly taken along line 3-3 of FIG. 1, and with the caster wheel removed;

FIG. 4 is a fragmentary side view of the leg and supporting framework assembly taken along line 4-4 of FIG. 2; and FIG. 5 is a plan view of the leg and supporting framework assembly taken generally along line 5-5 of FIG. 3.

DESCRIPTION OF THE PREFERRED EMBODIMENT

Referring first to FIGS. 1 and 2, the furniture supporting frame 10 is constructed of a conventional angle bar, which has a vertical flange 12 and a horizontal flange 14. Flanges 12 and 14 provide intersecting planar surfaces 12a and 14a which will bear against the attachment portion of the improved leg 16, when assembled thereto, as will be hereinafter described. Flange 12 has two horizontally aligned apertures or fastener openings 18 which, when assembled with the leg 16, will correspond to, and align with, similar apertures 22 provided in the upper portion of the leg 16.

Leg 16 is formed in a generally conical configuration and tapers downwardly from a top portion 23 to a generally cylindrical lower portion 24. Leg 16 is constructed of a single piece of relatively heavy gauge sheet metal which is stamped out, rolled, and formed to assume its downwardly tapered generally conical shape, with the sides 26 of the sheet metal being positioned adjacent one another (FIGS. 2 and 5). The tubular, cylindrical lower portion 24 is formed to receive a conventional caster wheel device 20, or, alternatively, other types of conventional furniture leg attachments, such as glides or feet (not shown). The top portion 23 is provided with a vertically disposed planar surface 28 and two spaced apart, horizontally aligned fastener receiving openings, or apertures 22, extend through portion 28.

A pair of integral, rectangular metal tabs 30 and 32 are bent outwardly from the top end of the leg and extend in opposite directions to form attachment and support surfaces. Each of these tabs is provided with a fastener receiving aperture or opening 38. The tabs 30 and 32 are bent outwardly with respect to the vertical center line of the leg to be nearly horizontal prior to assembly to the framework 10, so that the angle between the upper surfaces 30a and 32a of the tabs is slightly greater than 90° with respect to the vertical center line of the leg 16. Furthermore, the top surfaces of each of the tabs are additionally bent slightly out of the horizontal plane in the opposite transverse direction. Accordingly, the upper surfaces 30a and 32a of the tabs are not parallel to the horizontal in either transverse direction prior to assembly of the leg to the framework 10. The object of this particular double angle positioning of the top surface of the tabs 30a and 32a will be explained in greater detail hereinafter.

It will also be noted that there is a recess or cut away portion 34 at the top of the leg between tabs 30 and 33 to provide clearance when the leg is assembled to the framework 10.

In the particular embodiment illustrated, another angle bar or frame member 36 is secured to the frame member 10 to complete the conventional rectangular furniture supporting framework. It should be noted that in the present embodiment the point of attachment of frame member 36 to the frame member 10 is at the same point of attachment of the leg 16 by means of the tab 30 and the fastener 40. In other words, the fastener 40, a conventional rivet, passes through the aperture or opening in the frame member 36 and the frame member 10, as well as the opening 38 in the tab 30 in the leg 16 and all members are held together by one convenient fastener.

While the securing means utilized in this frame and leg assembly are in the form of conventional rivets 40, which are passed through the openings 18 in the frame member 10 and the openings 22 in the leg 16, rivets 40 could be replaced by any other conventional form of fasteners, such as screws, and/or nuts and bolts.

When the leg 16 is assembled to the frame 10, the vertical flat side surface 28 is positioned in face-to-face contact with the vertical planar surface 12a of the flange. The corresponding fastener-receiving openings or apertures 18 and 24 in each of the respective parts are brought in alignment and the fasteners 40 are passed therethrough and secured to rigidly hold the leg in the desired position. With these members assembled, the openings lined up and securing means in place, as described, the tabs 30 and 32 are in abutting relationship with the horizontal planar surface 14a of the horizontal flange 14 of the frame member 10. As previously explained, an additional fastener member 40 is secured through the frame member 10 and the aperture 38 of the tab 30 to draw the upper surface 30a of the tab 30 into surface-to-surface contact with the underside 14a of the frame member 10 and rigidly secure the tab 30 to the frame member. Because of the particular configuration or planar relationship of the tab in relation to the horizontal plane and the vertical center line of the leg, the fastener 40 draws, or springs, the tab 30 into engagement with the undersurface of the flange 14 by slightly deforming it to position it in a horizontal plane from its original position, which was slightly angular to the horizontal. This flat face-to-face contact provides a preload or spring load of the two surfaces together and operates essentially as a conventional lock washer or spring washer in that it loads the fastening means under tension, which will compensate for irregularities in the two surfaces, as well as take up any minor looseness. The other tab 32 is also in an abutting relationship with the undersurface 14a of the flange 14, but because of its initial slightly angular relationship with the horizontal plane, its entire surface is not in face-to-face contact with the frame member 10 until there is a vertical load placed thereon. Here again, the deformation of the tab 32 creates a slight spring loading of the leg against its fasteners and places the fasteners under a certain amount of tension to insure a firm contact by placing a tension load on the fasteners. The surfaces 30a and 32a of the tabs 30 and 32 against the underside of the flange 14 provides a large load distribution area to support the compressive loads placed on the furniture, as well as a larger foundation to resist the sideward deflection caused by stresses and strains by forces induced by moving the furniture and hitting obstacles. Because of this arrangement, it should be noted that only a minimum number of fastener devices are required to secure the surface 28 to the flange 12. Without the use of the tabs 30 and 32, at least one additional fastener would be required to provide rigidity against transverse deflection of the leg.

It should be noted that when the leg 16 is in its fully assembled position, the recess or cutaway portion 34 allows clearance around the fillet caused by the intersection and joining of the flanges 12 and 14.

In the present arrangement, this novel furniture leg provides a number of advantageous features. The hollow construction of the preferred embodiment enables the manufacture of a relatively light and economical leg structure which can sustain substantial loading. The material utilized to construct this leg is of such a thickness that the leg becomes very strong when pressed into its conical downwardly tapering shape and can resist substantially high compressive loads, as well as transverse deflective loads. Further, the conical form of the leg permits a relatively large load distribution area at the upper end thereof where the leg joins the furniture support framework.

While in the present arrangement the support member 36 is fastened to the frame at the point of connection of the support member 10 and the tab 30 of the leg 16, this particular relationship is not critical to the present invention. For example, the leg 16 can be applied to the member 10 at any point therealong provided that suitable openings are formed in the upper surface 14 to receive the fasteners 40 to secure the tab 30 thereto. The apertures provided in each of the tabs 30 and 32 allow for reversibility of the leg so that it can be applied to a frame member of the type described, regardless of the orientation of the support member. Furthermore, this type of leg arrangement could be applied to any type of furniture framework, so long as there is a pair of planar surfaces spaced in the vicinity of one another and substantially normal to one another. The surfaces do not have to be a part of an integral structural member, as shown in the preferred embodiment, an angle bar.

I claim:

1. A hollow, downwardly tapered supporting leg applicable to the side flange of a furniture supporting framework, said leg comprising: a generally cylindrically shaped lower end portion; an upper end portion having a flat, vertically disposed surface at one side thereof, the side opposite from said surface being open, a pair of horizontally aligned fastener receiving openings in the flat surface positioned equidistantly from the vertical center line of the leg, said upper end portion also having a pair of integral outwardly extending, oppositely directed tabs, said tabs each having a generally horizontally disposed upper surface with each tab having a fastener receiving opening therein, whereby when said leg is applied to a furniture framework having a vertical flange and a horizontal flange with fastener receiving openings therein, the flat vertically disposed surface will be in face-to-face contact with the inner surface of the vertical flange and upper surface of the tabs will be in face-to-face contact with the undersurface of the horizontal flange.

2. In combination with a bed frame having a frame member including a horizontal flange and a vertical flange, a leg member having a lower portion adapted to engage the floor and an upper portion secured to said frame member, said upper portion including a flattened section positioned in face abutting engagement with said vertical flange and spaced wing sections extending away from said flattened section and said vertical flange to collectively define an access opening therebetween, said upper portion further including a tab at the upper end of each wing section, said tabs being generally horizontally disposed and extending outwardly away from one another, each tab being positioned in engagement with said horizontal flange, at least one of said tabs being initially disposed at an angle with respect to said horizontal flange, said one tab having an opening therein, first fastener means securing the flattened section of said upper portion to said vertical flange, and second fastener means impaling said opening and securing said one tab to said horizontal flange, said second fastener means cooperating with said horizontal flange to draw said one tab toward face abutting engagement with said horizontal flange.

3. The combination of claim 2 wherein the other of said tabs is also initially disposed at an angle with respect to said horizontal flange.

4. The combination of claim 3 wherein said second fastener means comprises the sole means securing the upper portion of said leg member to said horizontal flange.

5. The combination of claim 2 wherein the upper portion of said leg member is generally conically shaped, and the lower end of said leg member is generally cylindrically shaped.